UNITED STATES PATENT OFFICE 2,623,873

DISAZO DYESTUFFS

Hans Ischer, Basel, Switzerland, assignor to Sandoz A. G., Basel, Switzerland, a Swiss firm No Drawing. Application June 1, 1951, Serial No. 229,529. In Switzerland June 27, 1950

6 Claims. (Cl. 260—187)

The present invention relates to a new group of valuable disazo dyestuffs, the individual members of which are obtained by coupling an appropriate diazotized aminoazo dyestuff which corresponds to the formula (I)
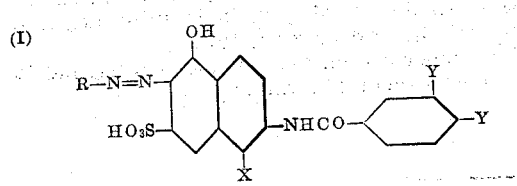

wherein R represents an aromatic radical of the benzene or naphthalene series which, in ortho-position to the azo group, bears a substituent which is capable of metal complex formation, X stands for H or SO₃H, one Y stands for CH₃, and the other Y stands for NH₂, with an amino-hydroxy-naphthalene-sulfonic acid which corresponds to the formula (II)
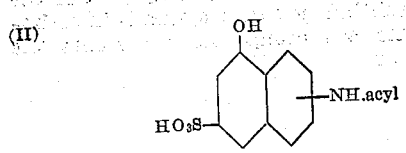

wherein the naphthalene nucleus may carry a further SO₃H group.

The dyestuffs (I) which serve as starting compounds for the preparation of the new dyestuffs may themselves be obtained, for example, by coupling a diazotized amine which, in ortho-position to the amino group, carries a substituent which is capable of metal complex formation—for instance, —OH, —COOH, —O—alkyl, —O—alkyl—COOH— with an aminobenzoyl-aminonaphthol sulfonic acid which corresponds to the formula (III)
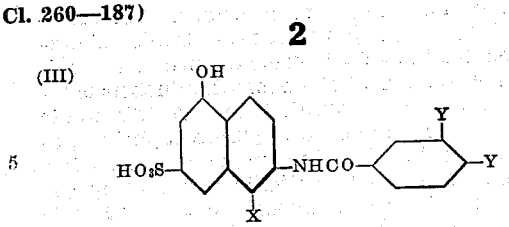

wherein X and Y have the afore-indicated significances.

Suitable amines for this purpose are primarily those of the benzene and naphthalene series, such for example as 1-methoxy-2-aminobenzene-4-sulfonic acid, 1-methoxy-2-amino-4-methyl-benzene, 1-methoxy-2-amino-5-nitrobenzene, 1-methoxy-2-amino-4-chlorobenzene, 1-methoxy-2-amino-4-sulfonic acid amide, 1-hydroxy-2-aminobenzene, 1-hydroxy-2-aminobenzene-4-sulfonic acid, 1-hydroxy-2-aminobenzene-4-sulfonic acid amide, 1-hydroxy-2-aminobenzene-4-sulfonic acid anilide, 1-hydroxy-2-aminobenzene-4-sulfonic acid-(4'-hydroxy-3'-carboxyanilide), 1-hydroxy-2-amino-6-chlorobenzene-4-sulfonic acid, 1-hydroxy-2-amino-4-chlorobenzene-6-sulfonic acid, 1-hydroxy-2-amino-4-nitrobenzene-6-sulfonic acid, 1-hydroxy-2-amino-6-nitrobenzene-4-sulfonic acid, 1-hydroxy-2-amino-3,6-dichlorobenzene-4-sulfonic acid, 1-hydroxy-2-amino-4-nitrobenzene, 1-hydroxy-2-amino-5-nitrobenzene, 1-hydroxy-2-amino-3,4,6-trichlorobenzene, 2-amino-benzene-1-carboxylic acid, 1-carboxy-2-aminobenzene-4-sulfonic acid, 1-carboxy-2-aminobenzene-5-sulfonic acid, 1-carboxy-2-aminobenzene-4-carboxylic acid, 1-carboxy-2-aminobenzene-5-carboxylic acid, 2'-amino-phenoxyacetic acid, 4'-chloro-2'-aminophenoxyacetic acid, 4'-methyl-2'-amino-phenoxyacetic acid, 4'-sulfamido-2'-amino-phenoxyacetic acid, 1-methoxy-2-aminonaphthalene, 2-methoxy-1-aminonaphthalene, 2-methoxy-1-aminonaphthalene-6-sulfonic acid, 1-amino-2-hydroxynaphthalene-4-sulfonic acid, 1-amino-2-hydroxy-6-nitronaphthalene-4-sulfonic acid, 3-aminonaphthalene-2-carboxylic acid, etc.

Suitable coupling components for use in preparing the starting dyestuffs (I) comprise, for example, 2-(3'-methyl-4'-aminobenzoyl)-amino-5 - hydroxynaphthalene -7- sulfonic acid, 2 - (4'-methyl - 3' - aminobenzoyl) - amino - 5 - hydroxynaphthalene-7-sulfonic acid, 2-(3'-methyl-4' - aminobenzoyl) - amino - 5 - hydroxy - naphthalene - 1,7 - disulfonic acid, 2 - (4' - methyl-3' - aminobenzoyl) - amino -5- hydroxynaphthalene-1,7-disulfonic acid, etc.

The further diazotization of the thus-obtained monoazo dyestuffs, corresponding to formula (I) supra, is advantageously carried out in indirect manner by adding the necessary quantity of sodium nitrite to a neutral or weakly alkaline suspension of the dyestuff and then acidifying with hydrochloric acid, or by running the nitrite-containing suspension into hydrochloric acid. The resultant diazo compounds are then, according to the invention, coupled with acylamino-hydroxynaphthalene-sulfonic acids. Suitable coupling components for this purpose, according to the invention, include for example 2-acetylamino-5-hydroxynaphthalene - 7 - sulfonic acid, 2 - carbethoxy - 5 - hydroxynaphthalene - 7 - sulfonic acid, 2-benzoylamino-5-hydroxynaphthalene-7-sulfonic acid, 2-benzoylamino-5-hydroxynaphthalene - 1,7 - disulfonic acid, 2 - (2' - carboxybenzoyl) - amino - 5 - hydroxynaphthalene - 7 - sulfonic acid, 2-(2'-chlorobenzoyl)-amino-5-hydroxynaphthalene-7-sulfonic acid, 2-cinnamoylamino-5-hydroxynaphthalene-7-sulfonic acid, 2-cinnamoylamino - 5 - hydroxynaphthalene - 1,7-disulfonic acid, 2 - (4' - benzoylaminobenzoyl)-amino - 5 - hydroxynaphthalene - 1,7 - disulfonic acid, 2 - benzoylamino - 8 - hydroxynaphthalene-6-sulfonic acid, 2 - cinnamoylamino - 8 - hydroxynaphthalene - 6 - sulfonic acid, 1 - benzoylamino - 8 - hydroxynaphthalene - 6 - sulfonic acid, 1 - cinnamoylamino - 8 - hydroxynaphthalene-6-sulfonic acid, 1-cinnamoylamino-8-hydroxynaphthalene-4,6-disulfonic acid, 1-benzoylamino - 8 - hydroxynaphthalene - 4,6 - disulfonic acid, 1-benzoylamino-5-hydroxynaphthalene-7-sulfonic acid, 2-(4'-aminobenzoyl)-amino-5-hydroxynaphthalene-7-sulfonic acid, 2-(3'-aminobenzoyl) - amino - 5 - hydroxynaphthalene - 7-sulfonic acid, 2-(4'-aminobenzoyl)-amino-5-hydroxynaphthalene - 1,7 - disulfonic acid, 2 - (4'-aminobenzoyl) - amino - 8 - hydroxynaphthalene - 6 - sulfonic acid, 2 - (3'-methyl - 4'-aminobenzoyl) - amino - 5 - hydroxynaphthalene - 7 - sulfonic acid, 2 - (4' - methyl-3'-aminobenzoyl) - amino - 5 - hydroxynaphthalene - 7 - sulfonic acid, 2 - (3' - methyl - 4'-aminobenzoyl) - amino - 5 - hydroxynaphthalene-1,7-disulfonic acid, etc.

The new disazo dyestuffs thus obtained may therefore be characterized by the formula $$R_1-N=N-R_2-N=N-R_3$$

wherein $R_1$ is the radical of a compound of the benzene or naphthalene series bearing in ortho-position to the azo group a substituent capable of forming metal complexes, $R_2$ stands for the radical of one of the coupling components:

2 - (3' - methyl - 4' - aminobenzoyl) - amino-5-hydroxynaphthalene-7-sulfonic acid,
2 - (4' - methyl - 3' - aminobenzoyl) - amino-5-hydroxynaphthalene-7-sulfonic acid,
2 - (3' - methyl - 4' - aminobenzoyl) - amino-5-hydroxynaphthalene-1,7-disulfonic acid, and
2 - (4' - methyl - 3' - aminobenzoyl) - amino-5-hydroxynaphthalene-1,7-disulfonic acid, and $R_3$ represents the radical of an acyl derivative of one of the following amino-hydroxynaphthalene-sulfonic acid coupling components:

1-amino-5-hydroxynaphthalene-7-sulfonic acid,
2-amino-5-hydroxynaphthalene-7-sulfonic acid,
2 - amino - 5 - hydroxynaphthalene - 1,7 - disulfonic acid,
2-amino-8-hydroxynaphthalene-6-sulfonic acid,
1-amino-8-hydroxynaphthalene-6-sulfonic acid,
1 - amino - 8 - hydroxynaphthalene - 3,6 - disulfonic acid,
1 - amino - 8 - hydroxynaphthalene - 4,6 - disulfonic acid, and
1-amino-8-hydroxynaphthalene-4-sulfonic acid.

Alternatively, the new disazo dyestuffs may be defined as corresponding to the formula

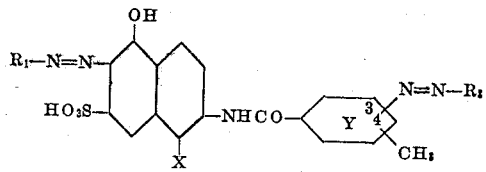

wherein $R_1$ and $R_3$ have the previously-indicated significances, X is H or $SO_3H$, the $-CH_3$ group is in one of the positions 3 and 4 of the nucleus Y, and the $-N=N-R_3$ group is in the other of these positions.

The new dyestuffs dye cotton and regenerated cellulose in clear red to violet shades, the wash fastness and light fastness properties of which are enhanced by after-treatment with metal-yielding agents, such as copper sulfate. It is also possible to convert the new dyestuffs, in so far as their solubility will permit, in substance into light-fast, direct dyeing dyestuffs.

The copper complex compounds correspond to the following general formula

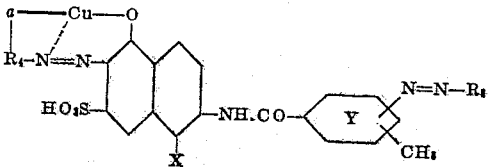

wherein $R_4$ is the radical of a compound of the benzene or naphthalene series, $a$ stands in ortho-position to the azo group and represents the radical $-O-$ or

and wherein $R_3$, X and Y have the previously-indicated significances.

In the following illustrative examples, the parts are by weight and the temperatures are in degrees centigrade. The term "soda" refers to sodium carbonate.

*Example 1*

18.9 parts of diazotized 1-hydroxy-2-aminobenzene-4-sulfonic acid are coupled with 37.2 parts of 2-(3'-methyl-4'-aminobenzoyl)-amino- 5-hydroxynaphthalene-7-sulfonic acid in soda-alkaline medium, and the entire amount of aminoazo dyestuff thus obtained is stirred into 400 parts of water and, after addition of 7 parts of sodium nitrite, cooled to 8°. At this temperature, 30 parts of concentrated hydrochloric acid are added and the mixture stirred until diazotization is complete (about 2 hours). The obtained diazo suspension is run, at 5°–10°, into a solution of 37.1 parts of 2-cinnamoylamino-5-hydroxynaphthalene-7-sulfonic acid and 40 parts of calcined soda in 500 parts of water. Coupling takes place very rapidly. After 2 hours, the reaction mixture is heated to 70°, the disazo dyestuff—which has gone into solution—precipitated with 50 parts of sodium chloride, and the precipitated dyestuff separated by filtration and dried at 90° in vacuo.

The new dyestuff thus obtained, which corresponds to the formula ed and the mixture stirred until diazotization is complete (about 1 hour). The obtained diazo suspension is allowed to run, at 10°, into a solution of 31.1 parts of 2-carbethoxyamino-5-hydroxynaphthalene-7-sulfonic acid and 40 parts of calcined soda in 400 parts of water. As soon as coupling is completed, the reaction mixture is heated to 60°, the disazo dyestuff salted out with 50 parts of sodium chloride, and the precipitated dyestuff separated by filtration and dried at 90° in vacuo.

The new dyestuff thus obtained, which corresponds to the formula

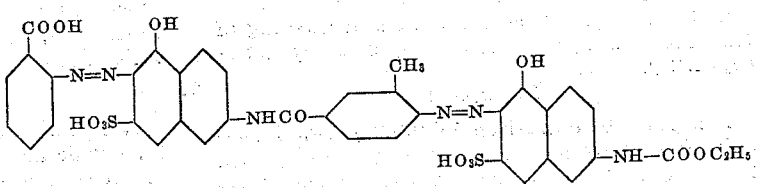

is a red powder which dissolves in water with blue-red coloration and dyes vegetable fibers in red shades, the fastness to light and washing of the resultant dyeings being improved by after-coppering.

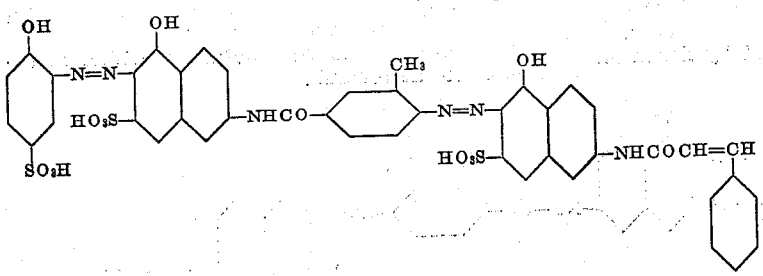

is a red-brown powder which dissolves in water with red coloration and dyes cotton and regenerated cellulose in red shades, the resultant dyeings turning toward the red-violet and becoming fast to light and washing upon after-treatment with copper sulfate.

The said dyestuff can also be converted in substance into a water-soluble copper complex which dyes vegetable fibers in red-violet shades which are very fast to light.

*Example 2*

13.8 parts of diazotized 2-aminobenzene-1-carboxylic acid are coupled with 37.2 parts of 2-(3'-methyl-4'-aminobenzoyl)-amino-5-hydroxynaphthalene-7-sulfonic acid in soda-alkaline medium, and the entire amount of aminoazo dyestuff thus obtained is stirred into 300 parts of water and, after addition of 7 parts of sodium nitrite, cooled to 0°. At this temperature, 30 parts of concentrated hydrochloric acid are add-

*Example 3*

18.7 parts of diazotized 2-aminonaphthalene-3-carboxylic acid are coupled with 37.2 parts of 2-(3'-methyl-4'-aminobenzoyl)-amino-5-hydroxynaphthalene-7-sulfonic acid in soda-alkaline medium and the entire amount of aminoazo dyestuff thus obtained is stirred into 300 parts of water and, after addition of 7 parts of sodium nitrite, cooled to 0°. At this temperature 30 parts of concentrated hydrochloric acid are added and the mixture stirred until diazotization is complete (about 1 hour). The obtained diazo suspension is run, at 10° into a solution of 42.3 parts of 2-benzoylamino-5-hydroxynaphthalene-1,7-disulfonic acid and 40 parts of calcined soda in 400 parts of water. As soon as coupling is completed, the reaction mixture is heated to 60°, the disazo dyestuff salted out with 50 parts of sodium chloride, and the precipitated dyestuff separated by filtration and dried at 90° in vacuo.

The new dyestuff thus obtained, which corresponds to the formula

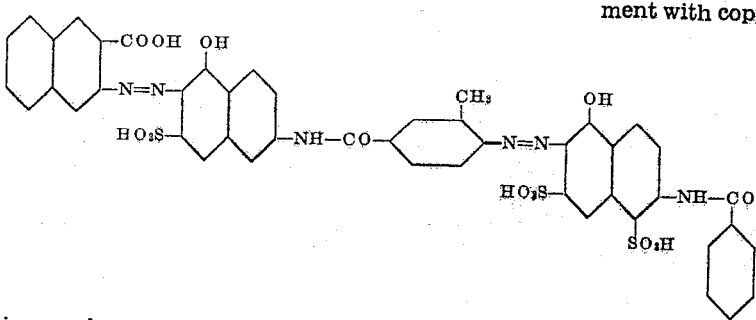

is a red powder which dissolves in water with blue-red coloration and dyes vegetable fibers in red shades, the fastness to light and washing of the resultant dyeings being improved by after-coppering.

*Example 4*

22.5 parts of diazotized 1-hydroxy-2-amino-6-chlorobenzene-4-sulfonic acid are coupled with 37.2 parts of 2-(3'-methyl-4'-aminobenzoyl)-amino-5-hydroxynaphthalene-7-sulfonic acid in soda-alkaline medium, and the entire amount of aminoazo dyestuff thus obtained is stirred into 400 parts of water and, after addition of 7 parts of sodium nitrite, cooled to 8°. At this temperature, 30 parts of concentrated hydrochloric acid are added and the mixture stirred until diazotization is complete (about 2 hours). The obtained diazo suspension is allowed to run at 5°–10°, into a solution of 54.2 parts of 2-(4'-benzoylaminobenzoyl)-amino-5-hydroxynaphthalene-1,7-disulfonic acid and 40 parts of calcined soda in 500 parts of water. Coupling takes place very rapidly. After 2 hours the reaction mixture is heated to 70°, the dissolved disazo dyestuff salted out with 50 parts of sodium chloride, and the precipitated dyestuff separated by filtration and dried at 90° in vacuo.

The new dyestuff thus obtained which corresponds to the formula

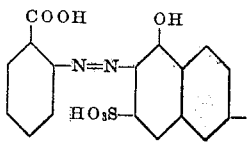

is a red-brown powder which dissolves in water with red coloration and dyes cotton and regenerated cellulose in red shades, the resultant dyeings turning toward the red-violet and becoming fast to light and washing upon after-treatment with copper sulfate.

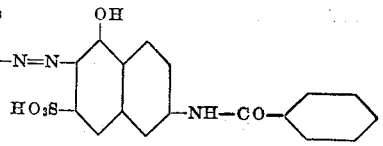

The said dyestuffs can also be converted in substance into a water-soluble copper complex which dyes vegetable fibres in red-violet shades which are very fast to light.

*Example 5*

13.8 parts of diazotized 2-aminobenzene-1-carboxylic acid are coupled with 37.2 parts of 2-(3'-methyl-4'-aminobenzoyl)-amino-5-hydroxynaphthalene-7-sulfonic acid in soda-alkaline medium, and the entire amount of aminoazo dyestuff thus obtained is stirred into 300 parts of water and, after addition of 7 parts of sodium nitrite, cooled to 0°. At this temperature, 30 parts of concentrated hydrochloric acid are added and the mixture stirred until diazotization is complete (about 1 hour). The obtained diazo suspension is run at 10°, into a solution of 34.3 parts of 2-benzoylamino-5-hydroxynapthalene-7-sulfonic acid and 40 parts of calcined soda in 400 parts of water. As soon as coupling is completed, the reaction mixture is heated to 60°, the disazo dyestuff salted out with 50 parts of sodium chloride, and the precipitated dyestuff separated by filtration and dried at 90° in vacuo.

The new dyestuff thus obtained, which corresponds to the formula

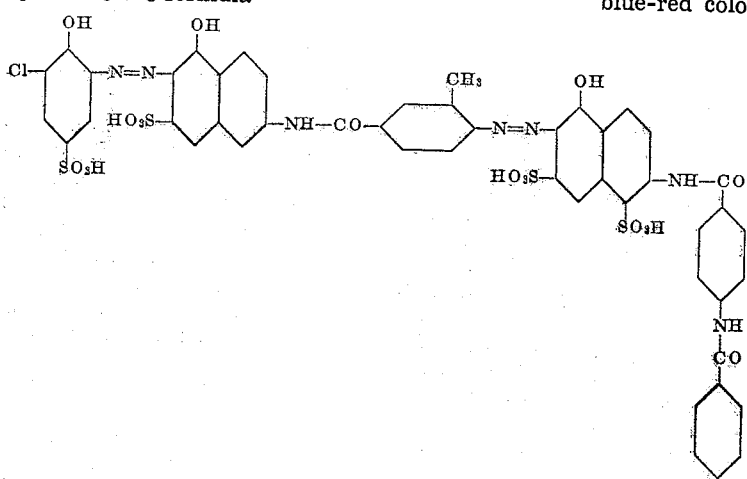

is a red powder which dissolves in water with blue-red coloration and dyes vegetable fibers in red shades, the fastness to light and washing of the resultant dyeings being improved by after-coppering.

The copper complex compounds of the dyestuffs disclosed in the Examples 1 to 5 respectively correspond to the following formulae:
ceding examples by equivalent quantities of the reactants set forth in the following tabular examples, and while otherwise proceeding as de-
1.
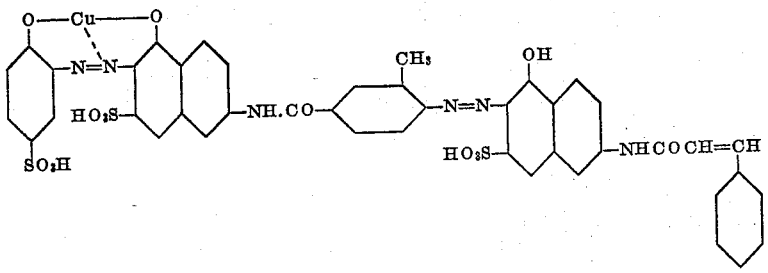
2.
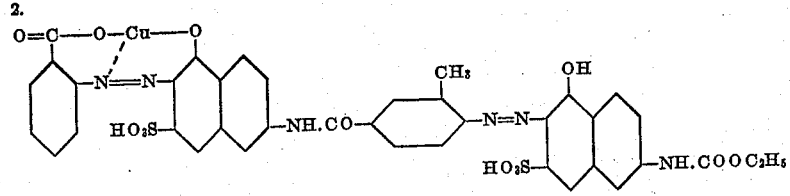
3.
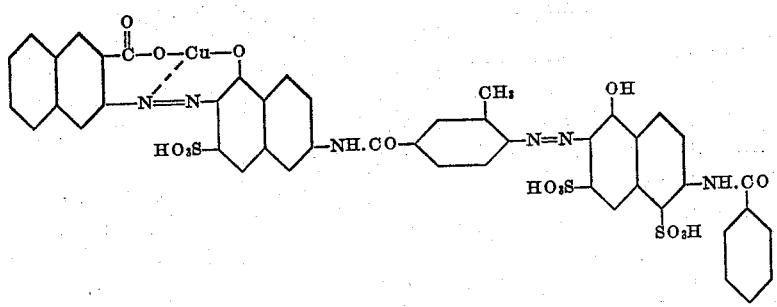
4.
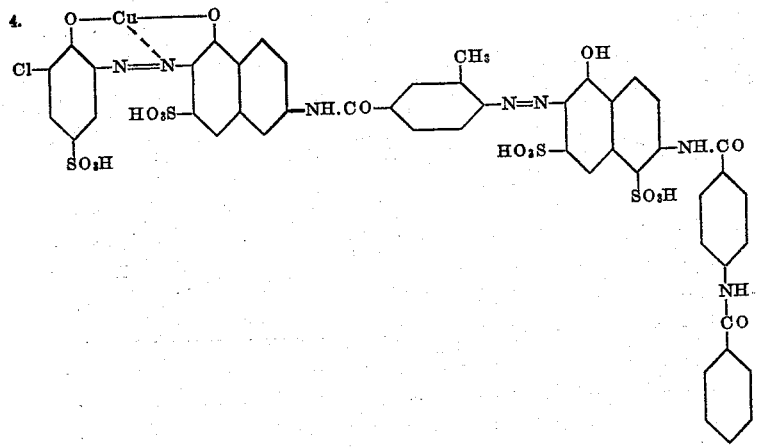
5.
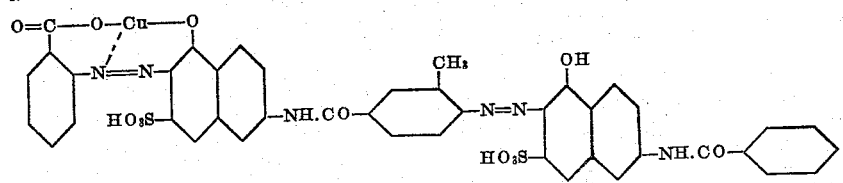
By replacing the reactants recited in the preceding examples, the corresponding new disazo dyestuffs (see formulae of representative products, infra) are obtained:

| Example No. | Diazo compound of aminoazo dyestuff from— | | Coupled with end component— | Shade of after-coppered dyeing |
|---|---|---|---|---|
| 6 | 2'-amino-phenoxy-acetic acid | 2-(3'-methyl-4'-aminobenzoyl)-amino-5-hydroxy-naphthalene-7-sulfonic acid. | 2-benzoylamino 5-hydroxy-naphthalene-7-sulfonic acid. | Red. |
| 7 | ......do...... | ......do...... | 2-(2'-carboxy-benzoyl)-amino-5-hydroxy-naphthalene-7-sulfonic acid. | Do. |
| 8 | ......do...... | 2-(4'-methyl-3'-aminobenzoyl)-amino-5-hydroxy-naphthalene-7-sulfonic acid. | 2-benzoylamino-5-hydroxy-naphthalene-7-sulfonic acid. | Do. |
| 9 | 3-amino-naphthalene-2-carboxylic acid. | 2-(3'-methyl-4'-aminobenzoyl)-amino-5-hydroxy-naphthalene-7-sulfonic acid. | ......do...... | Do. |
| 10 | 2-amino-benzene-1-carboxylic acid. | ......do...... | ......do...... | Do. |
| 11 | ......do...... | 2-(3'-methyl-4'-aminobenzoyl)-amino-5-hydroxy-naphthalene-1,7-disulfonic acid. | ......do...... | Do. |
| 12 | ......do...... | ......do...... | 2-(4'-benzoyl-aminobenzoyl)-amino-5-hydroxy-naphthalene-7-sulfonic acid. | Do. |
| 13 | 1-hydroxy-2-amino-benzene-4-sulfonic acid. | ......do...... | 2-benzoylamino-5-hydroxy-naphthalene-7-sulfonic acid. | Red-violet. |
| 14 | 1-hydroxy-2-amino-6-chloro-benzene-4-sulfonic acid. | 2-(3'-methyl-4'-aminobenzoyl)-amino-5-hydroxy-naphthalene-7-sulfonic acid. | ......do...... | Do. |
| 15 | ......do...... | ......do...... | 2-acetylamino-5-hydroxy-naphthalene-7-sulfonic acid. | Do. |
| 16 | 1-hydroxy-2-amino-benzene-4-sulfonic acid. | ......do...... | ......do...... | Bordeaux. |
| 17 | 2-aminobenzene-1-carboxylic acid. | 2-(4'-methyl-3'-aminobenzoyl)-amino-5-hydroxy-naphthalene-7-sulfonic acid. | 2-benzoylamino-5-hydroxynaphthalene-7-sulfonic acid. | Red. |
| 18 | ......do...... | 2-(3'-methyl-4'-aminobenzoyl)-amino-5-hydroxy-naphthalene-7-sulfonic acid. | 2-benzoylamino-5-hydroxy-naphthalene-1,7-disulfonic acid. | Blue-red. |
| 19 | ......do...... | ......do...... | 2-(4'-benzoyl-aminobenzoyl)-amino-5-hydroxy-naphtalene-1,7-disulfonic acid. | Do. |
| 20 | ......do...... | ......do...... | 2-carbethoxy-amino-5-hydroxy-naphthalene-7-sulfonic acid. | Red. |
| 21 | 1-hydroxy-2-amino-benzene-4-sulfonic acid. | ......do...... | ......do...... | Bordeaux. |
| 22 | 1-hydroxy-2-amino-benzene-4-sulfonic acid amide. | ......do...... | ......do...... | Do. |
| 23 | 3-amino-napthalene-2-carboxylic acid. | ......do...... | ......do...... | Blue-red. |
| 24 | ......do...... | ......do...... | 2-acetylamino-5-hydroxy-napthalene-7-sulfonic acid. | Do. |
| 25 | 1-hydroxy-2-amino-benzene, 4-sulfonic acid. | ......do...... | ......do...... | Red-violet. |
| 26 | 2-aminobenzene-1-carboxylic acid | ......do...... | ......do...... | Blue-red. |
| 27 | ......do...... | ......do...... | 2-(4'-amino-benzoyl)-amino-5-hydroxy-napthalene-7-sulfonic acid. | Do. |
| 28 | ......do...... | ......do...... | 2-(3'-aminobenzoyl)-amino-5-hydroxy-naphthalene-7-sulfonic acid. | Do. |
| 29 | 1-methoxy-2-amino-benzene-4-sulfonic acid. | ......do...... | 2-(2'-carboxy-benzoyl)-amino-5-hydroxy-naphthalene-7-sulfonic acid. | Red. |
| 30 | 1-hydroxy-2-amino-6-chlorobenzene-4-sulfonic acid. | ......do...... | ......do...... | Red-violet. |
| 31 | 4'-sulfamido-2'-aminophenoxy-acetic acid. | ......do...... | ......do...... | Brownish-red. |
| 32 | 3-amino-naphthalene-2-carboxylic acid. | ......do...... | ......do...... | Blue-red. |
| 33 | 2-amino-benzene-1-carboxylic acid. | ......do...... | ......do...... | Do. |
| 34 | ......do...... | ......do...... | 2-(2'chloro-benzoyl)-amino-5-hydroxynaphthalene-7-sulfonic acid. | Do. |
| 35 | ......do...... | ......do...... | 2-cinnamoyl-amino-5-hydroxy-naphthalene-7-sulfonic acid. | Do. |
| 36 | ......do...... | ......do...... | 1-benzoylamino-5-hydroxy-naphthalene-7-sulfonic acid. | Bordeaux. |
| 37 | 1-hydroxy-2-amino-benzene-4-sulfonic acid. | ......do...... | 2-cinnamoylamino-5-hydroxy-naphthalene-7-sulfonic acid. | Red violet. |
| 38 | ......do...... | ......do...... | 1-benzoylamino-5-hydroxy-naphthalene-7-sulfonic acid. | Do. |
| 39 | 1-hydroxy-2-amino-6-chlorobenzene-4-sulfonic acid. | ......do...... | 1-benzoylamino-8-hydroxy-naphthalene-6-sulfonic acid. | Violet. |
| 40 | 3-aminonaphthalene-2-carboxylic acid. | ......do...... | ......do...... | Blue-red. |
| 41 | 2-aminobenzene-1-carboxylic acid. | ......do...... | ......do...... | Do. |
| 42 | ......do...... | ......do...... | 2-benzoylamino-8-hydroxy-naphthalene-6-sulfonic acid. | Do. |
| 43 | 1-hydroxy-2-amino-benzene-4-sulfonic acid-(4'-hydroxy-3'-carboxy-anilide). | ......do...... | 2-benzoylamino-5-hydroxy-naphthalene-7-sulfonic acid. | Red violet. |
| 44 | ......do...... | ......do...... | 2-benzoylamino-5-hydroxy-naphthalene-1,7-disulfonic acid | Do. |
| 45 | ......do...... | 2-(3'-methyl-4'-aminobenzoyl)-amino-5-hydroxy-naphthalene-1,7-disulfonic acid. | 2-benzoylamino-5-hydroxy-naphthalene-7-sulfonic acid. | Do. |
| 46 | ......do...... | ......do...... | 2-cinnamoylamino-5-hydroxy-naphthalene-7-sulfonic acid. | Do. |
| 47 | 2-amino-5-chloro-benzene-1-carboxylic acid. | 2-(3'-methyl-4'-aminobenzoyl)-amino-5-hydroxy-naphthalene-7-sulfonic acid. | 2-benzoylamino-5-hydroxy-naphthalene-7-sulfonic acid. | Red. |
| 48 | 1-carboxy-2-amino-benzene-4-sulfonic acid anilide. | ......do...... | ......do...... | Do. |
| 49 | ......do...... | 2-(3'-methyl-4'-aminobenzoyl)-amino-5-hydroxy-naphthalene-1,7-disulfonic acid. | ......do...... | Blue-red. |

Formulae of representative products set forth in the preceding tabular examples are as follows:

| Example No. | Formula |
|---|---|
| 7 | Structure: (2-OCH₂COOH, 1-OH naphthyl)-N=N-(HO₃S naphthyl)-NHCO-(2-CH₃ phenyl)-N=N-(HO₃S, 1-OH naphthyl)-NHCO-(COOH phenyl) |
| 17 | Structure: (2-COOH phenyl)-N=N-(HO₃S, 1-OH naphthyl)-NHCO-(2-CH₃ phenyl)-N=N-(HO₃S, 1-OH naphthyl)-NHCO-(phenyl) |
| 22 | Structure: (2-OH, 5-SO₂NH₂ phenyl)-N=N-(HO₃S, 1-OH naphthyl)-NHCO-(2-CH₃ phenyl)-N=N-(HO₃S, 1-OH naphthyl)-NH-COOC₂H₅ |
| 32 | Structure: (COOH naphthyl)-N=N-(HO₃S, 1-OH naphthyl)-NHCO-(2-CH₃ phenyl)-N=N-(HO₃S, 1-OH naphthyl)-NHCO-(COOH phenyl) |
| 45 | Structure: (2-OH, 5-SO₂NH-(4-COOH, 2-OH phenyl) phenyl)-N=N-(HO₃S, SO₃H, 1-OH naphthyl)-NHCO-(2-CH₃ phenyl)-N=N-(HO₃S, 1-OH naphthyl)-NHCO-(phenyl) |
| 49 | Structure: (2-COOH, 5-SO₂NH-phenyl phenyl)-N=N-(HO₃S, SO₃H, 1-OH naphthyl)-NHCO-(2-CH₃ phenyl)-N=N-(HO₃S, 1-OH naphthyl)-NHCO-(phenyl) |

Having thus disclosed the invention, what is claimed is:

1. A disazo dyestuff which corresponds to the formula

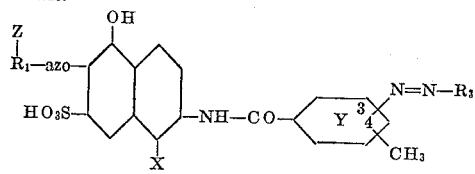

wherein $R_1$ is the radical of a member selected from the group consisting of benzene and naphthalene compounds, Z stands for a substituent selected from the group consisting of —OH, —OCH$_3$, —COOH and —OCH$_2$COOH and being linked to $R_1$ in ortho-position to -azo-, $R_3$ is the radical of a member selected from the group consisting of 1-acylamino-5-hydroxynaphthalene-7-sulfonic acid, 2-acylamino-5-hydroxynaphthalene-7-sulfonic acid, 2-acylamino-5-hydroxynaphthalene-1,7-disulfonic acid, 2-acylamino-8-hydroxynaphthalene-6-sulfonic acid, 1-acylamino-8-hydroxynaphthalene-3,6-disulfonic acid, 1-acylamino - 8 - hydroxynaphthalene - 4,6 - disulfonic acid, 1-acylamino-8-hydroxynaphthalene-6-sulfonic acid and 1-acylamino-8-hydroxynaphthalene-4-sulfonic acid, X stands for a member selected from the group consisting of hydrogen and SO$_3$H, and wherein the —CH$_3$ group is in one of the positions 3 and 4 of the nucleus Y, the —N=N—R$_3$ group being in the other of these positions.

2. The disazo dyestuff of the formula

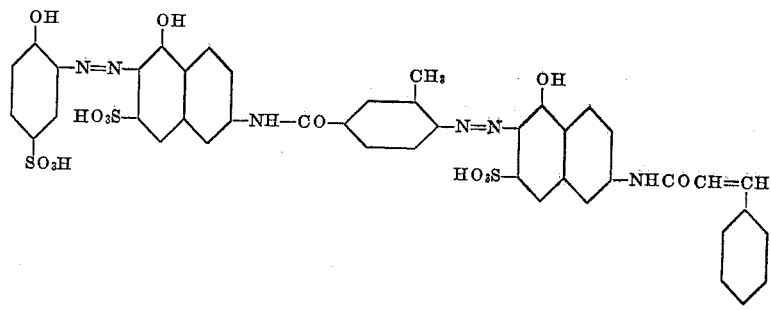

3. The disazo dyestuff of the formula

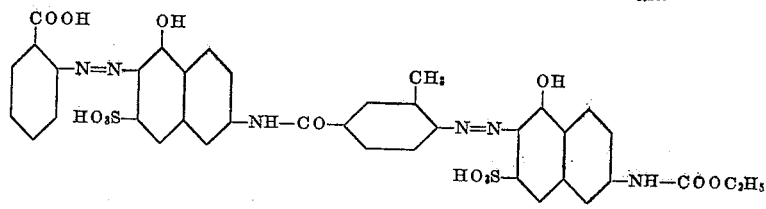

4. The disazo dyestuff of the formula

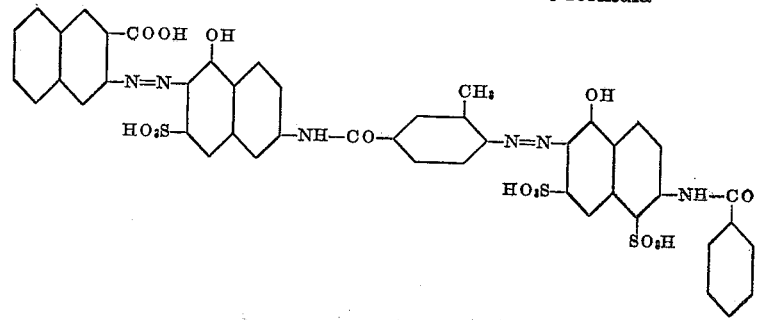

5. The disazo dyestuff of the formula

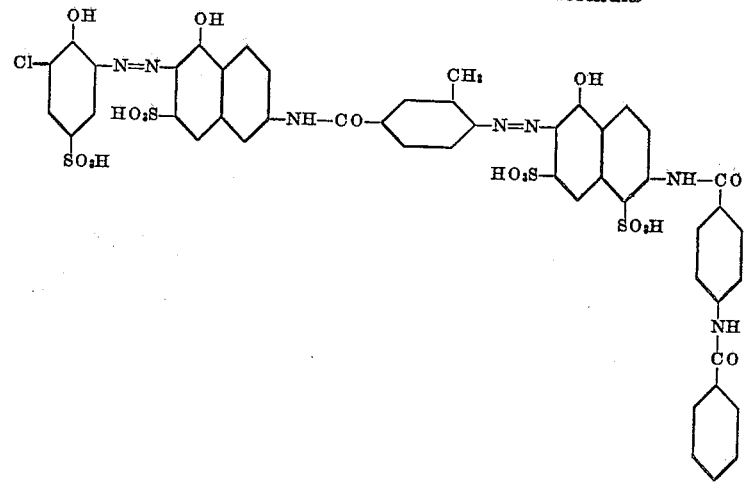

6. The disazo dyestuff of the formula
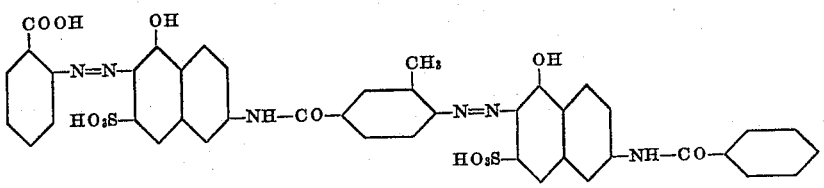
HANS ISCHER.
REFERENCES CITED
The following references are of record in the file of this patent:
UNITED STATES PATENTS
| Number | Name | Date |
|---|---|---|
| 1,065,950 | Luther et al. | July 1, 1913 |
| 1,940,683 | Jordan | Dec. 26, 1933 |